Jan. 22, 1946.  H. C. FLINT  2,393,499
SEAT FOR AIRCRAFT
Filed Sept. 2, 1943  2 Sheets-Sheet 1
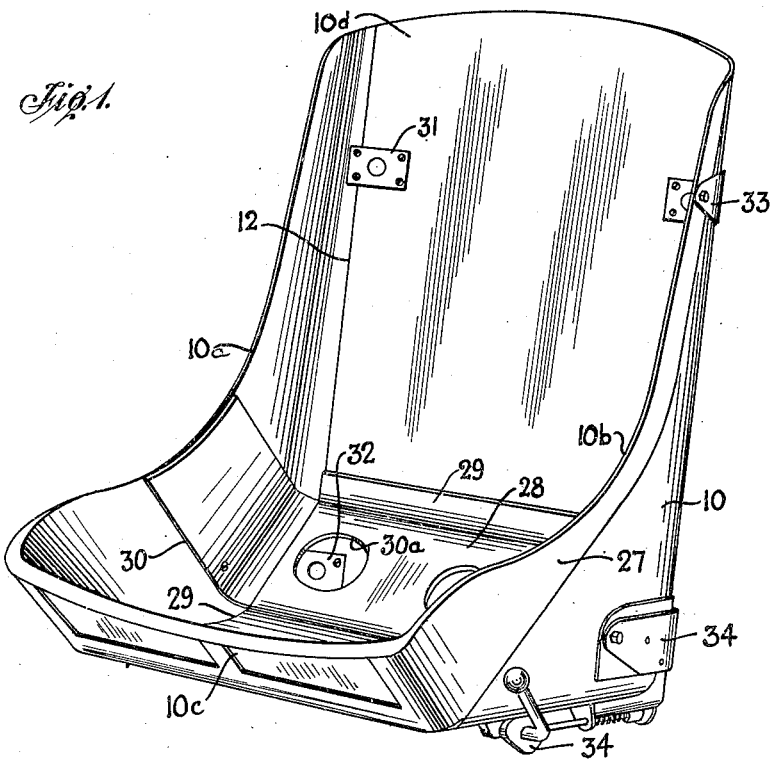
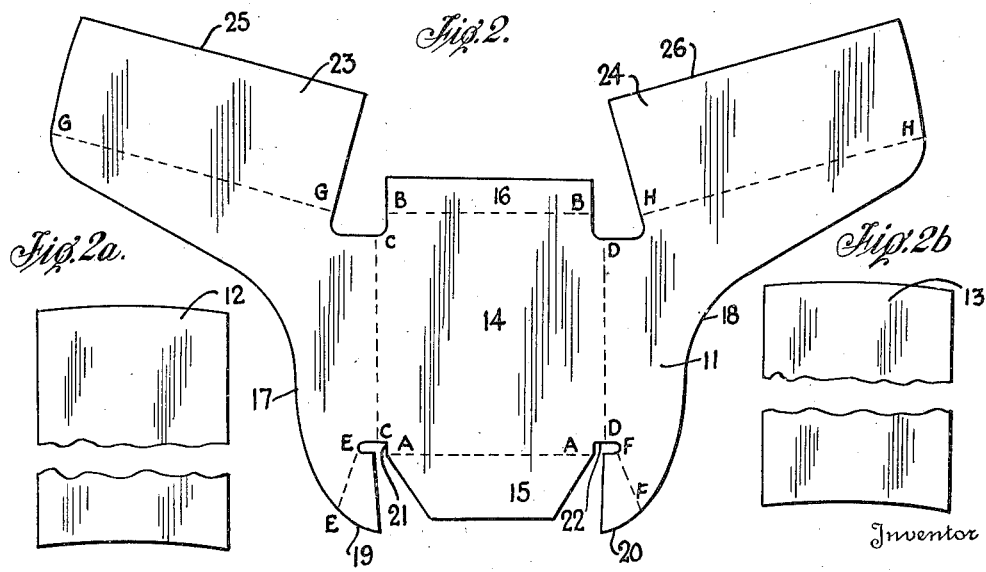
Inventor
HYLAND C. FLINT
By Ely & Frye
Attorneys Jan. 22, 1946. H. C. FLINT 2,393,499
SEAT FOR AIRCRAFT
Filed Sept. 2, 1943 2 Sheets-Sheet 2
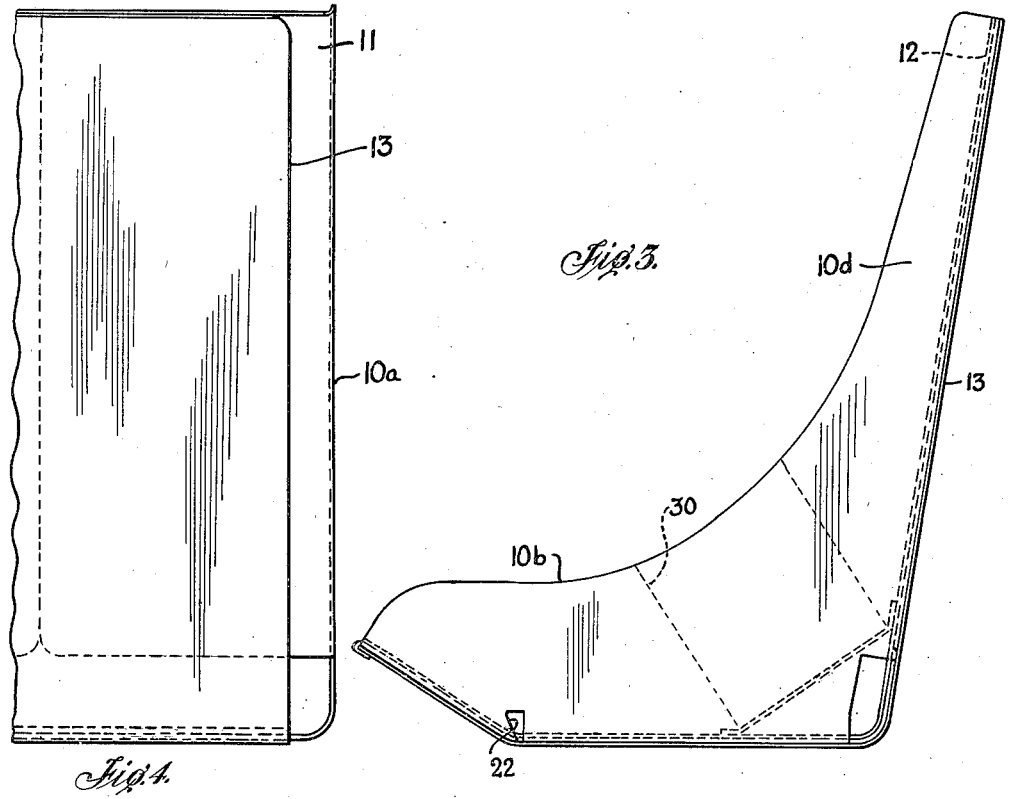
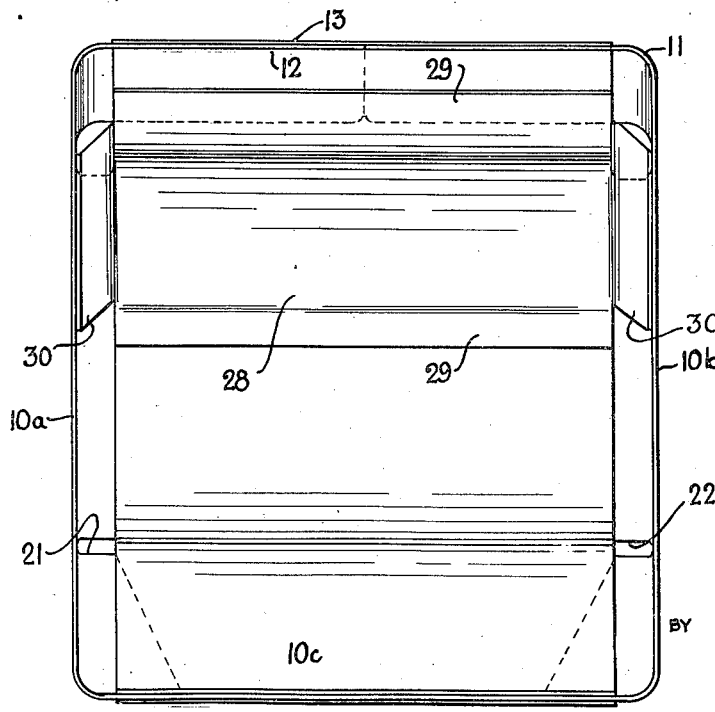
Inventor
HYLAND C. FLINT
BY
Attorneys Patented Jan. 22, 1946

2,393,499

UNITED STATES PATENT OFFICE 2,393,499

SEAT FOR AIRCRAFT

Hyland C. Flint, Akron, Ohio, assignor to The Firestone Tire & Rubber Company, Akron, Ohio, a corporation of Ohio Application September 2, 1943, Serial No. 501,008

7 Claims. (Cl. 155—5)

This invention relates to seats, especially to seats which must have a high strength to weight ratio, such as pilots' seats for airplanes.

Heretofore, pilots' seats for airplanes have primarily been made from a light metal, such as aluminum. The present scarcity of such metals has dictated that pilots' seats be made from other materials, if possible, and attempts have been made to form satisfactory seats from various kinds of plastics or fiber board or wood, including plywood. These seats, in some cases, have been metal reinforced, even to the extent of defeating the purpose of forming a non-metallic seat. Plywood has been a preferred substitute material, but in general it has been difficult to form satisfactory wooden seats of the required design and strength to weight to bulk ratios from such substance.

The general object of this invention is to form an improved type of pilot seat from light weight, non-metallic material.

Another object of the invention is to form a complete "bucket" type seat having no material therein shaped in compound curves.

Another object of the invention is to fabricate a wooden seat that has no grain end joints or grain ends in abutment with a flat surface, the grain of which is at right angles to the grain ends.

A further object of the invention is to provide a compact, easily formed, high strength, light weight, "bucket" shaped wooden seat.

The foregoing and other objects will be manifest from the specification considered with particular reference to the accompanying drawings, in which:

Fig. 1 is a perspective view of a seat embodying the invention completely fitted for use in an airplane;

Figs. 2, 2a and 2b are plan views of the principal pieces of sheet material, center, top and bottom, used in forming the seat of Fig. 1, the mid-portions of the top and bottom pieces of material being broken away;

Fig. 3 is a side elevation of the seat of Fig. 1, the metal fittings being omitted;

Fig. 4 is a rear elevation of the seat of Fig. 1 with part of the seat being broken away; and Fig. 5 is a plan of the seat of Fig. 1.

Referring in detail to the accompanying drawings, a "bucket" or cup shaped pilots' seat 10 is shown, which seat is normally made from sheets 11, 12 and 13 of plywood, although paper, fiber broad or other similar materials may be used to form the sheets 11, 12 and 13 in some instances. The sheets 11, 12 and 13 are shown in Figs. 2, 2a and 2b prior to being formed into the seat 10. The sheets 12 and 13 are rectangular in shape, while the sheet 11 is of irregular shape, being specially cut to permit sections thereof to be bent with relation to others in order to form a receiving or "bucket" portion for the seat. Use of the integral sheet avoids the necessity of forming joints in the portions of the seat 10 which normally will be most severely stressed in use.

The sheet 11 includes a seat or floor area 14, which has tongue areas 15 and 16 extending therefrom; these are bent in the sections indicated by the lines A—A and B—B, respectively, to form upwardly and outwardly extending front and rear portions, respectively, for the seat 10. The tongue 15 is of trapezoidal form and diminishes in size as it extends from the seat area 14, as shown in Figure 2. Sides 10a and 10b are formed for the seat 10 by bending side areas 17 and 18, respectively, upwardly, and slightly outwardly, from the floor area 14 at opposed portions thereof indicated by the lines C—C and D—D. The side areas 17 and 18 have flap sections 19 and 20, which, when bent in towards the floor area 14 upon the lines E—E and F—F, respectively, abut the edges of the trapezoidal tongue 15 and can be combined therewith to form a front lip 10c for the seat. Holes or slots 21 and 22 are formed in the sheet 11 at the front corners of the floor area 14 to enable the sides 17 and 18 and tongue 15 to be bent upwardly therefrom, and then together to form the desired "cupping" or "bucket" effect in the finished seat without formation of double curves in the material forming the seat and without stressing or straining such material excessively.

A back 10d is formed for the seat by bending substantially rectangular areas 23 and 24 of the sheet 11 on lines G—G and H—H, respectively, inwardly with relation to the floor area 14 after the side areas 17 and 18 are bent up from the floor area on the lines C—C and D—D. The tongue 16 is formed to abut against the lower edges of the areas 23 and 24 when they are bent in to form the seat back. Edges 25 and 26 of the areas 23 and 24 are normally brought into substantial abutment when such areas are finally positioned.

The seat 10 is finished by applying the rectangular sheets 12 and 13, which are approximately as wide as the floor area 14, to the upper and lower surfaces of the center zone of the sheet 11. The sheets 12 and 13 extend from the top of the back 10d of the seat, across the floor area 14 and up to the front edge of the lip 10c of the seat, each of which is a substantially flat surface. Of course, all of the sheets 11, 12 and 13 are bonded together and the sheets 12 and 13 serve to reinforce the joints formed between the tongue 15 and the sections 19 and 20 as well as the joints between areas 23 and 24, 23 and 16, and 24 and 16 at the back 10d of the seat.

The sheet 11 usually is appreciably thicker than the sheets 12 anh 13, which are normally only a veneer, or very thin sheet of plywood, whereas the sheet 11 comprises several laminations of wood with the grain thereof extending in opposite directions in adjacent layers. The sheet may be up to ⅛ inch in thickness as that is about as thick plywood as can readily be bent to form the seat of the invention.

The seat 10 of the invention can be formed in any desired manner, one method being to bend the plywood to the approximate contour desired in a heated press. Then the several sheets are superimposed in a mold of the exact final seat shape desired and pressed against the mold, as by a rubber blanket, while heated. Any suitable thermosetting bonding agent is associated with the plywood sheets, or plywood and veneer sheets, so as to effect a bonding thereof during the molding operations.

The seat 10 usually requires reinforcing in localized areas to enable the seat to be mounted, as in an airplane. Also special reinforcing may be used due to the nature of the infrequent peak loads imposed on the seat when it is in use. To this end a reinforcing strip 27 is associated with the outer edge of the seat to strengthen it for the great tensional forces set up therein such as when a pilot is sitting in the seat, when used in an airplane, and pulls out of a dive. The strip 27 also reinforces the connection between the tongue 15 and the side sections 19 and 20. The strip 27 may be made of laminated plywood, or other suitable material, and may be attached to the seat during the molding thereof. The strip 27 extends from the top of one side portion of the seat down around the front portion of the seat and up the other side to the top thereof. An inclined parachute positioning member 28 is positioned in the rear of the seat 10 to block off the rear of the seat, and to aid in keeping parachutes worn by pilots sitting on the seats in the forward part of the seat. This member 28 may be made of plywood and is folded and bent so that sections 29 are bonded to the back and base of the seat while sections 30 are bonded to the sides of the seat. This member 28, which has apertures 30a formed therein to permit access to the rear corner of the seat, also is normally secured to the seat during the molding thereof.

Small reinforcing plates 31 and 32, usually made of metal, are secured inside the seat to reinforce it in the portions thereof which engage with the means on which the seat 10 is supported. In this connection, metallic means generally designated by numerals 33 and 34 are secured to the back and under surfaces of the seat 10 for use in mounting the seat and adjusting the position thereof.

Practice of the invention results in forming a compact, light weight seat structure able to stand specified service loads without the use of critical metals. The seat proper is formed solely from wood and only requires metal in the seat mounting means. By use of one basic sheet and reinforcing plies in forming the seat 10, as described herein, the use of grain end joints in severe load areas is avoided and no grain ends are in abutment with a flat wooden surface, the grain of which is at right angles to the grain ends. In the specification and claims the term pilots' seat is used to describe the type of seat and the invention applies to all seats of that type whether specifically for the pilot of the craft or for some other occupant of the plane.

While one embodiment of the invention has been completely illustrated and described herein by way of illustration, it will be apparent that modifications may be made thereto without departing from the scope of the invention, as defined in the appended claims.

What is claimed is:

1. A light weight "bucket" shape airplane pilots' seat adapted to receive a parachute therein, said seat comprising a basic laminated plywood sheet having a flat quadrilateral floor area, a rectangular tongue extending upwardly and rearwardly from said floor area, a trapezoidal tongue extending upwardly and forwardly from said floor area and decreasing in width with increase in length from said floor area, and side areas extending upwardly and outwardly from said floor area to form sides therefor and being provided with substantially rectangular edge areas bent inwardly with relation to said floor area and towards each other to form a back for the seat in combination with said rectangular tongue, said basic plywood sheet having slots cut therein extending to the corners of said floor area to facilitate bending said side areas and tongues with relation to said floor area; said side areas also having forwardly extending flap sections bent inwardly with relation to said floor area to combine with said trapezoidal tongue to form a front for said seat; plywood veneers integrally bonded to both the upper and lower surfaces of said basic sheet in the floor, back and front areas thereof to strengthen and reinforce said basic sheet and the joints therein; and a reinforcing strip bonded to the unit formed of said veneers and said basic sheet and extending around the front and side edges thereof.

2. A wooden seat for use in airplanes, which seat comprises a basic layer of laminated plywood forming a solid seat portion having outwardly and upwardly extending side portions each of which has an integral back section bent inwardly of the seat and towards each other to form a back for the seat, said basic layer also having substantially flat front and rear tongue sections extending outwardly and upwardly from said seat portion, said side portions being provided with edge sections bent in to lie adjacent to and in the plane of said front tongue section, said basic plywood layer having slots cut therein at the corners of said seat portion to facilitate bending said side and tongue areas with relation thereto, and rectangular layers of plywood extending over and bonded to both the upper and lower surfaces of said front tongue and said edge sections of said side portion and said back sections of said side portions to strengthen and reinforce said basic plywood layer and form the seat therewith.

3. An airplane seat comprising a base plywood sheet having center, front and side portions, the front and side portions of said plywood sheet being bent upwardly from the center portion, said side portions being provided with edge areas which are bent towards each other to form a back for the seat, said front portion defining a plane and being cut away at the edges thereof, said side portions also having sections thereof bent therefrom to lie in the corners of the plane defined by said front portion and abut the side edges of said front portion, and plywood veneers adhered to both surfaces of said base sheet over the front, center and back portions of said seat to reinforce and position same.

4. An airplane seat comprising a base plywood sheet having center, front and opposed side portions and with the front and side portions bent upwardly from the center portion, said side portions having rectangular edge areas which are bent towards each other to lie in a plane with adjacent edges in abutting relation to form a back for the seat, said side portions having sections thereof bent inwardly with relation to said center portion to lie in substantial abutment with the edges of said front portion, and plywood veneers adhered to both the upper and lower surfaces of said base sheet over the front, center and back portions of said seat to reinforce the joints formed in said base plywood sheet in the front and back of the seat.

5. An airplane pilots' seat comprising a basic sheet of laminated plywood, having two pair of opposed edge portions bent upwardly from the sheet to define a flat floor area therein, the side edge portions being larger than the front and back edge portions and having sections bent inwardly with relation to said floor area and combining with the front and back edge areas to form a front lip and a back for the seat, and rectangular plywood veneer strips bonded to the opposite surfaces of said basic sheet in the back, floor and front lip areas thereof to reinforce same.

6. An airplane pilots' seat comprising a basic sheet of plywood having a front portion and a pair of opposed side edge portions bent upwardly from the sheet to define a flat floor area therein and to form sides for the seat, the side edge portions being larger than the front portion and having sections bent inwardly with relation to the floor area and combining with the front edge area to form a front lip for the seat, the side edge portions also having sections bent therefrom to form a back for the seat; and rectangular plywood veneer strips bonded to the opposite surfaces of said basic sheet in the back, floor and front lip areas thereof to reinforce same.

7. A seat construction comprising a base plywood sheet having a center seat floor portion, an integral front portion and opposed side portions, the floor and side portions being bent upwardly from the center floor portion, said side portions having integral rear marginal extensions which are bent towards each other to lie substantially in a plane, with the adjacent edges of said marginal extensions in abutting relation to form a back for the seat, the abutting marginal extensions forming a seam in said back, and plywood veneers adhered to both the upper and lower surfaces of said base sheet to reinforce said portions and overlie said seam in the back portion of the seat in overlapping relation to said marginal extensions.

HYLAND C. FLINT.